(12) United States Patent
Sugiyama et al.

(10) Patent No.: US 10,873,063 B2
(45) Date of Patent: Dec. 22, 2020

(54) BATTERY

(71) Applicant: ELIIY Power Co., Ltd., Tokyo (JP)

(72) Inventors: Hideyuki Sugiyama, Shinagawa-ku (JP); Hiroshi Sato, Shinagawa-ku (JP); Takeshi Sawada, Shinagawa-ku (JP); Kazutoshi Miyauchi, Shinagawa-ku (JP)

(73) Assignee: ELIIY POWER CO., LTD, Tokyo (JP)

( * ) Notice: Subject to any disclaimer, the term of this patent is extended or adjusted under 35 U.S.C. 154(b) by 229 days.

(21) Appl. No.: 16/061,983

(22) PCT Filed: Dec. 16, 2015

(86) PCT No.: PCT/JP2015/085242
§ 371 (c)(1),
(2) Date: Jun. 13, 2018

(87) PCT Pub. No.: WO2017/104025
PCT Pub. Date: Jun. 22, 2017

(65) Prior Publication Data
US 2018/0375074 A1  Dec. 27, 2018

(51) Int. Cl.
*H01M 2/10* (2006.01)
*H01M 2/34* (2006.01)
(Continued)

(52) U.S. Cl.
CPC ........... *H01M 2/1072* (2013.01); *H01M 2/10* (2013.01); *H01M 2/34* (2013.01); *H01M 10/425* (2013.01);
(Continued)

(58) Field of Classification Search
None
See application file for complete search history.

(56) References Cited

U.S. PATENT DOCUMENTS

2004/0095093 A1  5/2004 Baba et al.
2015/0064503 A1  3/2015 Kawaguchi et al.
(Continued)

FOREIGN PATENT DOCUMENTS

EP  2911219 A1  8/2015
JP  2003-297317 A  10/2003
(Continued)

OTHER PUBLICATIONS

Japan Patent Office, International Search Report cited in the International Stage of this Application (PCT/JP2015/085242), dated Mar. 22, 2016.
(Continued)

*Primary Examiner* — Wyatt P McConnell
(74) *Attorney, Agent, or Firm* — Stites & Harbison, PLLC; Terry L. Wright; Jeffrey A. Haeberlin

(57) ABSTRACT

The present invention is conceived in such a way as to prevent any damage to the battery management unit even if the solution leaks out of the cell, providing the battery with high safety. The battery according to the present invention is characterized by being provided with a cell, a battery management unit for managing the cell, a protection case holding the battery management unit, and a housing containing the cell and the protection case, wherein the protection case inside is hermetically sealed.

22 Claims, 4 Drawing Sheets

(51) Int. Cl.
*H01M 10/48* (2006.01)
*H01M 10/42* (2006.01)

(52) U.S. Cl.
CPC .... *H01M 10/48* (2013.01); *H01M 2010/4271* (2013.01); *H01M 2200/103* (2013.01); *H01M 2220/10* (2013.01); *H01M 2220/20* (2013.01)

(56) References Cited

U.S. PATENT DOCUMENTS

2015/0295283 A1* 10/2015 Eom .................. H01M 10/482
 429/61
2015/0318725 A1* 11/2015 Brockman ................ H02J 7/00
 340/636.1

FOREIGN PATENT DOCUMENTS

| JP | 2004-079416 A | 3/2004 |
| JP | 2015-008121 A | 1/2015 |
| JP | 2015-125799 A | 7/2015 |
| KR | 2007-0097150 A | 10/2007 |
| WO | 2015-029619 A1 | 3/2015 |

OTHER PUBLICATIONS

European Patent Office, Extended Search Report issued in corresponding EP Application No. 15910716.8, dated Apr. 8, 2019.

* cited by examiner

[FIG. 1]
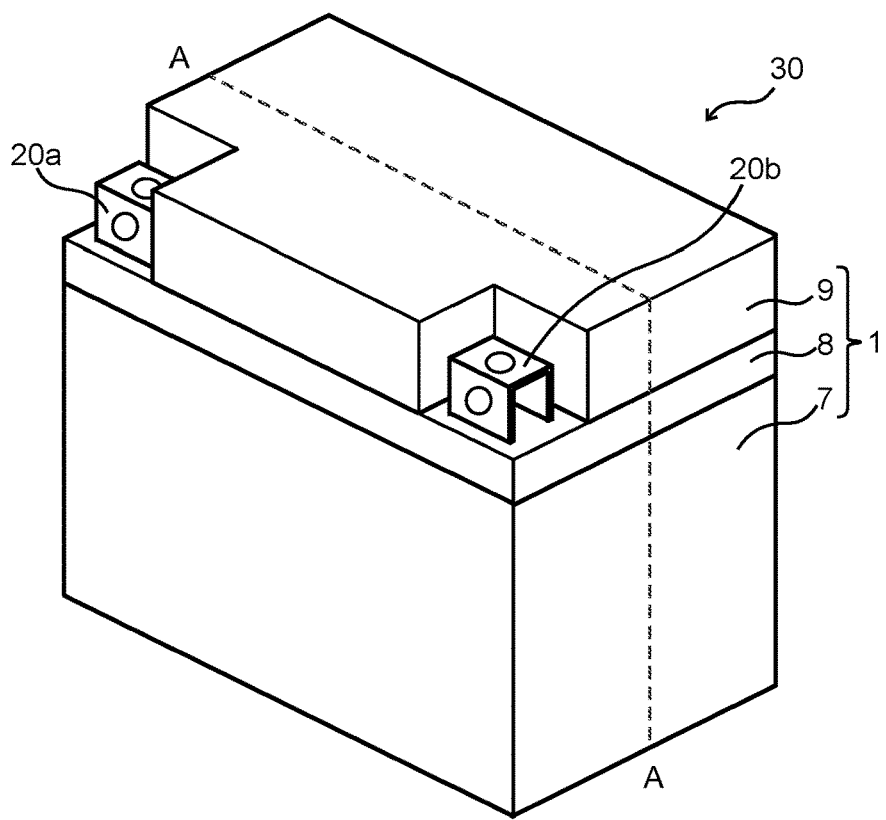
[FIG. 2]
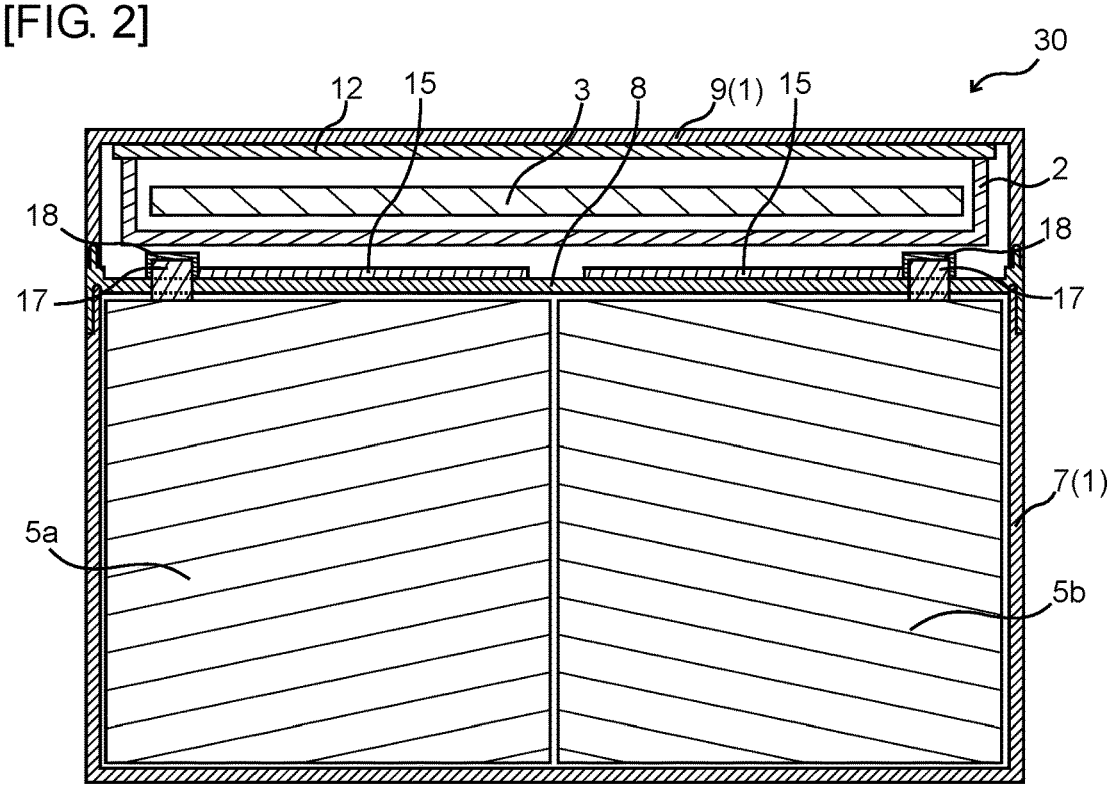

[FIG. 3]
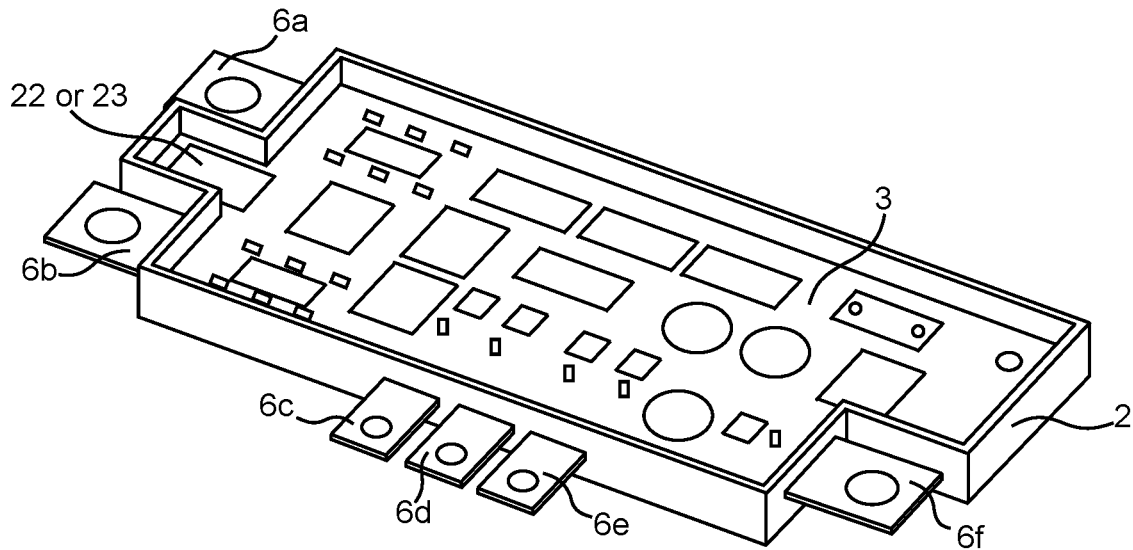
[FIG. 4]
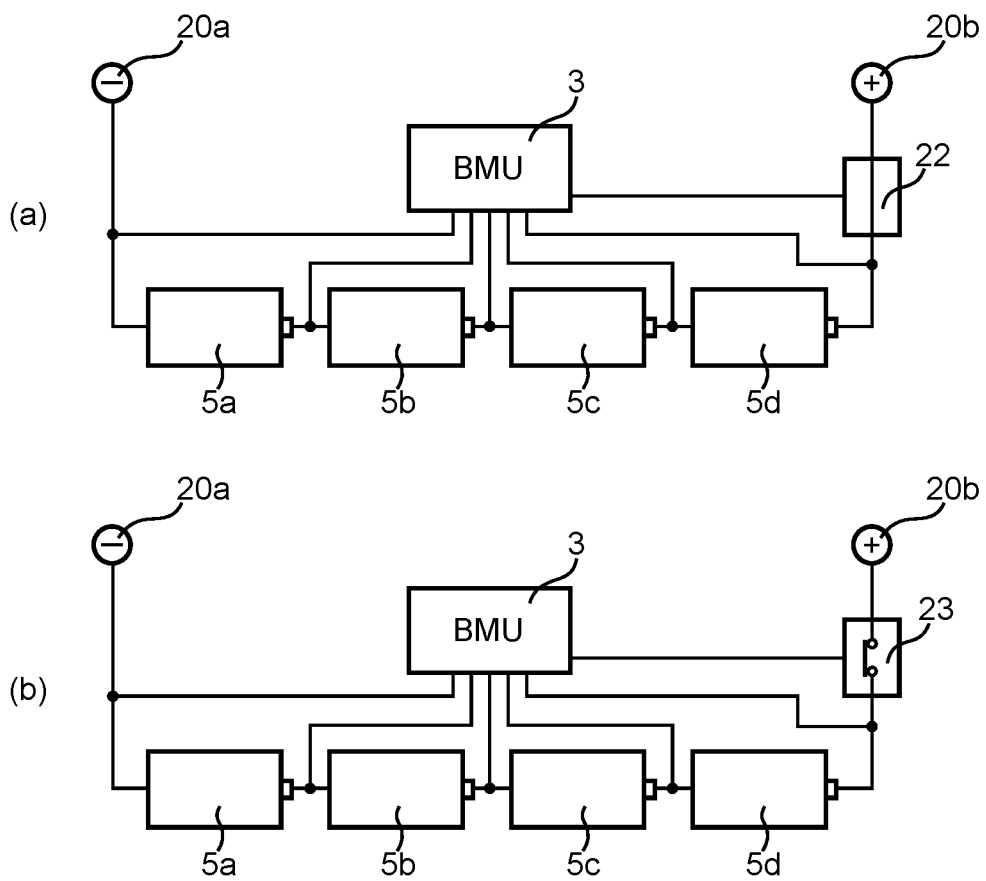

[FIG. 5]
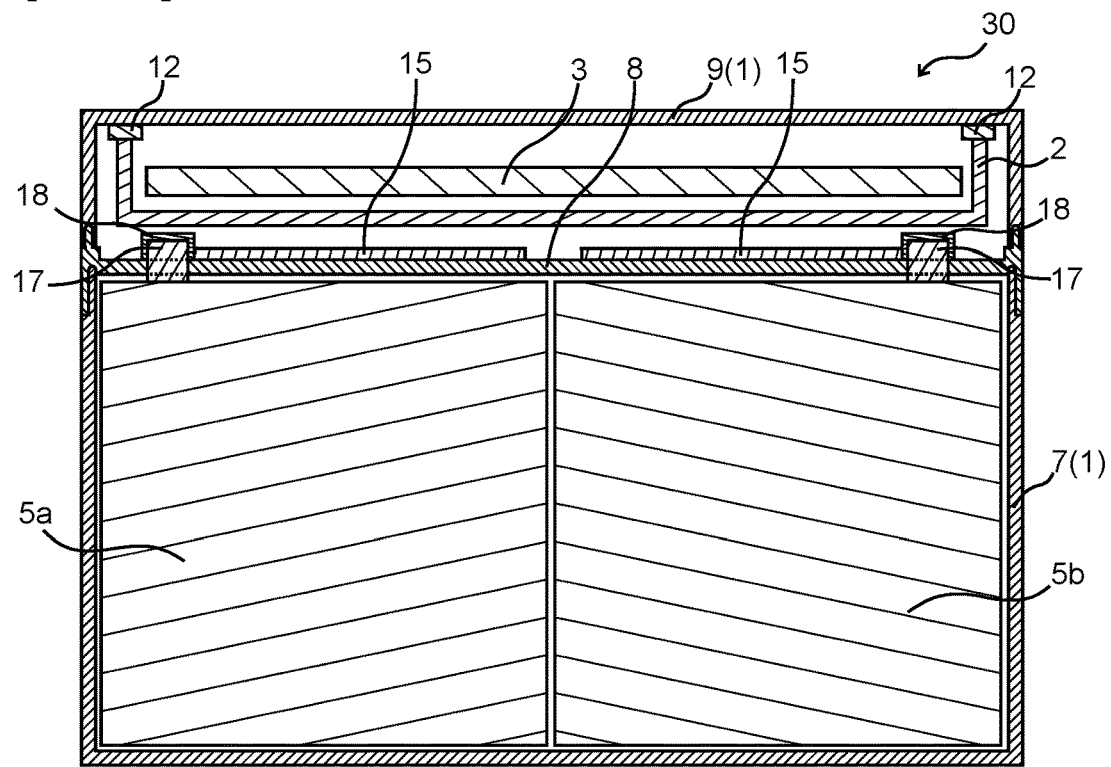
[FIG. 6]
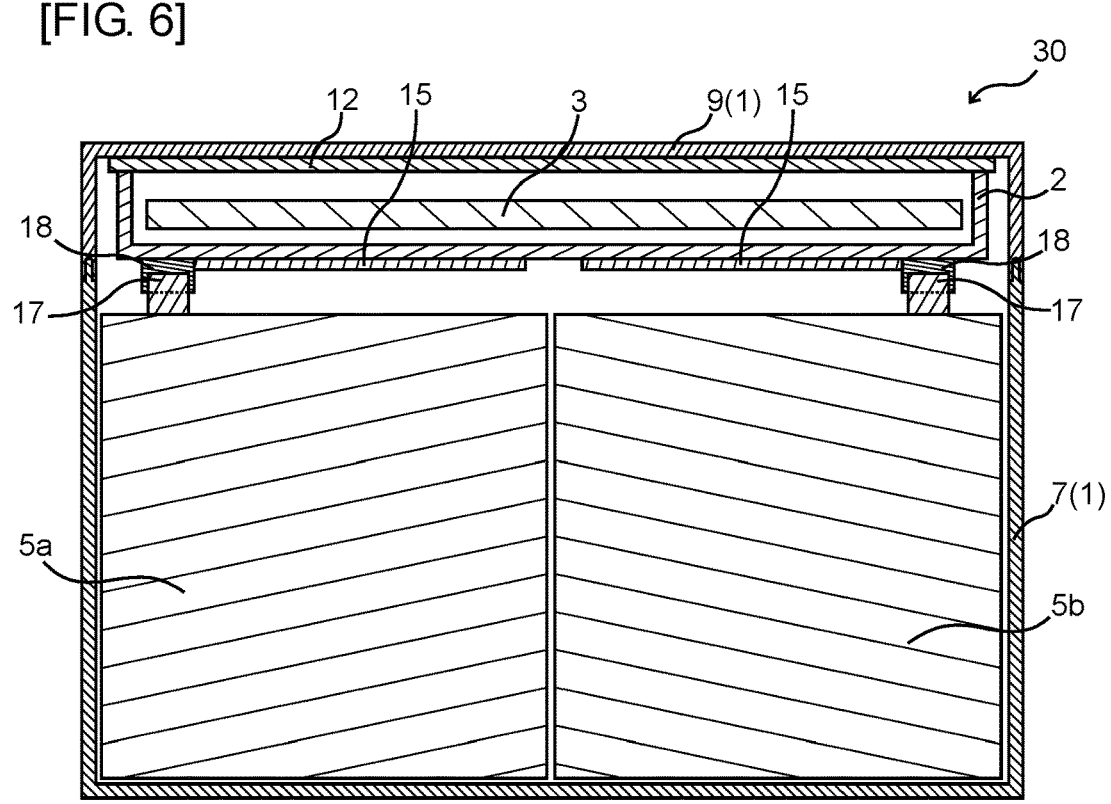

[FIG. 7]
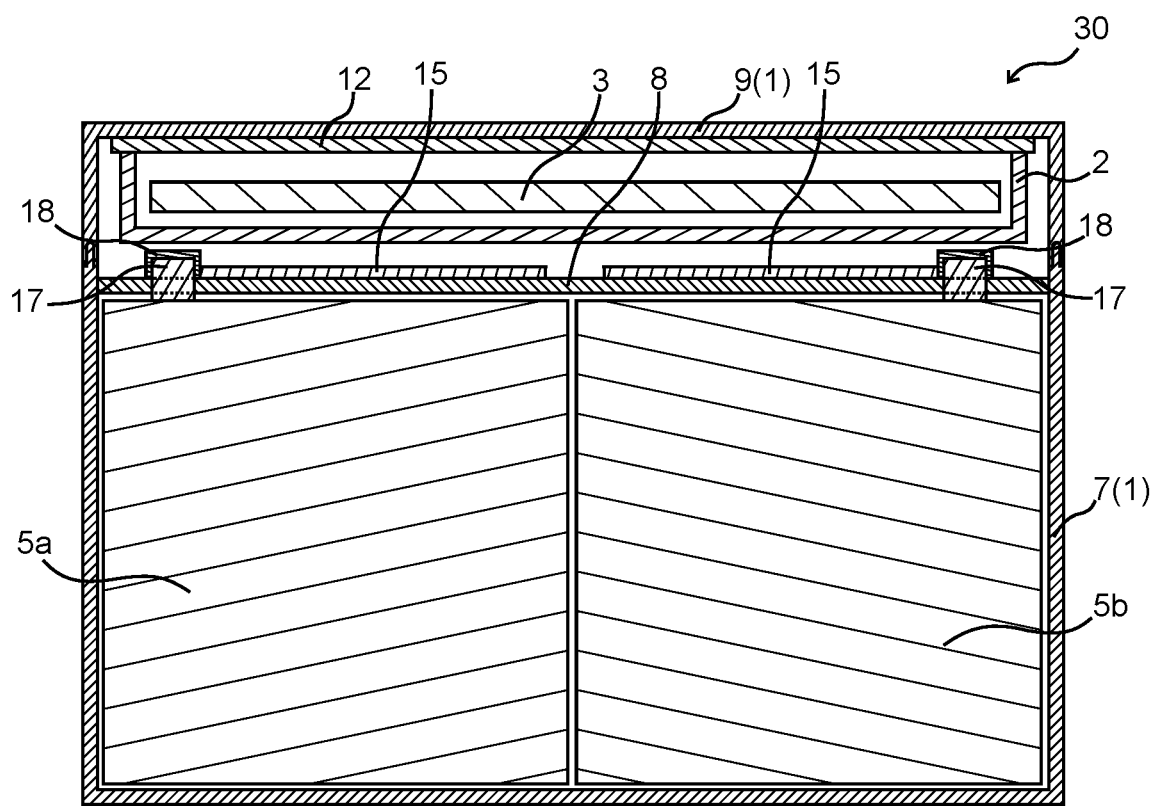

BATTERY

TECHNICAL FIELD

The present invention relates to a battery.

BACKGROUND ART

In recent years, electric batteries have been used for various purposes; and large-capacity batteries in particular have been used as power supplies for electric-powered vehicles or as electric power storages.

When a battery is used solely as an electric cell, an electric voltage of the electric cell may be lower than an electric voltage required by equipment. In such a case, several cells need to be connected in series so that their supply voltage becomes high enough to reach the required voltage. Also, the singly-used electric cell may not be able to supply enough quantity of electricity required by the equipment. In such a case, several cells need to be connected in parallel so that their supply electricity becomes high enough to reach the required quantity of electricity.

This allows a battery whose housing houses the several cells connected in series or in parallel to supply electric power to the equipment. The battery having a battery management unit (BMU) installed therein for managing these several cells has been known (see, for example, Patent Literature 1). The BMU is normally to measure an electric voltage, etc. of each cell and to detect an overcharge or an overdischarge at a time of charging or discharging the cells. The BMU can also function to keep balance of the electric voltages of the cells.

CITATION LIST

Patent Literature

[PTL 1]
Japanese Unexamined Patent Application Publication No. 2015-8121

SUMMARY OF INVENTION

Technical Problems

In traditional batteries having the battery management unit installed therein, the housing houses the cells and the battery management unit; therefore, in case a solution of any cell leaks, the battery management unit may be damaged and may not be able to detect an overcharge.

In view of such circumstances, the present invention is conceived in such a way as to prevent any damage to the battery management unit even if the solution leaks out of the cell, providing the battery with high safety.

Solutions to Problems

The present invention provides a battery characterized by being provided with a cell, a battery management unit for managing the cell, a protection case holding the battery management unit, and a housing containing the cell and the protection case, wherein the protection case inside is hermetically sealed.

Advantageous Effects of Invention

Since the battery according to the present invention is provided with the cell, the battery management unit for managing the cell, and the housing containing the cell and the battery management unit, charge and discharge can be carried out while the battery management unit manages the cell, enabling the battery to improve in safety. The cell can be connected electrically to the battery management unit in the housing; and the battery can be downsized, and the number of components can be reduced.

The battery according to the present invention is provided with the protection case that holds the battery management unit and is housed in the housing; and since this protection case inside is hermetically sealed, the housing is capable of having separate spaces: a space for the cell and a space for the battery management unit. This makes it possible to prevent an electrolytic solution leaking out of the cell from entering (or infiltrating into) the protection case, which holds the battery management unit, in case of solution leakage, preventing any damage to the battery management unit. This makes it possible to improve the safety of the battery.

BRIEF DESCRIPTION OF DRAWINGS

FIG. 1 illustrates a diagrammatic perspective view of a battery in accordance with a first embodiment of the present invention.

FIG. 2 illustrates a diagrammatic cross-section view of the battery taken along the dashed line A-A of FIG. 1.

FIG. 3 illustrates a diagrammatic perspective view of a protection case holding a battery management unit, the protection case being to be contained in the battery in accordance with the first embodiment of the present invention.

FIGS. 4(*a*) and 4(*b*) respectively illustrate diagrammatic circuit diagrams of the battery in accordance with the first embodiment of the present invention.

FIG. 5 illustrates a diagrammatic cross-section view of a battery in accordance with a second embodiment of the present invention.

FIG. 6 illustrates a diagrammatic cross-section view of a battery in accordance with a third embodiment of the present invention.

FIG. 7 illustrates a diagrammatic cross-section view of a battery in accordance with a fourth embodiment of the present invention.

DESCRIPTION OF EMBODIMENTS

A battery according to the present invention is characterized by being provided with a cell, a battery management unit for managing the cell, a protection case holding the battery management unit, and a housing containing the cell and the protection case, wherein the protection case inside is hermetically sealed.

It is preferable that the protection case in the battery according to the present invention is provided with several connection terminals that lead from the inside of the protection case to the outside, and it is preferable that at least one of the several connection terminals electrically connects the battery management unit to the cell. This makes it possible to electrically connect the battery management unit to the cell while retaining the inside of the protection case as an enclosed space. It is preferable that the battery according to the present invention is further provided with a wiring board having a wiring that electrically connects the cell to the battery management unit, it is preferable that the housing comprises a lid and a container for containing the cell, it is preferable that the wiring board is situated between the lid and the cell contained in the container, and it is preferable that the protection case is situated between the wiring board and the lid. Such a configuration makes it possible to electrically connect, through the wiring board, the cell contained in the container to the battery management unit held in the protection case. This also makes it possible to miniaturize the battery. Moreover, this allows the housing to become a sealed structure.

It is preferable in the battery according to the present invention that a part of the wiring board functions as a part of the housing. This allows the wiring board to have an external connection terminal.

It is preferable in the battery according to the present invention that the wiring board is provided with a cell-side wiring terminal and a slit that penetrates the wiring board, it is preferable that the cell is provided with a cell terminal, and it is preferable that the cell terminal passes through the slit and is coupled to the cell-side wiring terminal. This makes it possible to eliminate any wiring for connecting the cell to the wiring board, and the number of components can be reduced in the battery. This also makes it possible to reduce costs for preparing the battery.

It is preferable that the battery according to the present invention is further provided with a sealing material provided between the protection case and the lid, and it is preferable that the protection case is hermetically sealed with the sealing material. This enables the inside of the protection case to easily become an enclosed space.

It is preferable in the battery according to the present invention that the housing houses several cells, and it is preferable that the several cells are connected in series or in parallel. This allows the battery to have the several cells, and enables the battery to have a large output voltage or output power.

It is preferable in the battery according to the present invention that the battery management unit is configured to measure an electric voltage of each cell. This makes it possible to detect an overcharge of at least one cell out of the several cells contained in the battery, enabling the battery to improve in safety.

It is preferable that the battery according to the present invention is further provided with an external connection terminal connected electrically to the cell, and a fuse or a relay; it is preferable that the fuse or the relay is placed at a pathway for electrically connecting the cell to the external connection terminal; and it is preferable that the battery management unit is configured to output a signal to shut off the electric connection between the cell and the external connection terminal with use of the fuse or the relay once the battery management unit detects an overcharge of the cell. This makes it possible to shut off the electric connection between the external connection terminal and the cell in case the battery management unit detects an overcharge, enabling the battery to improve in safety.

It is preferable that the battery according to the present invention is provided with an external connection terminal connected electrically to the cell, it is preferable that the battery management unit has a fuse or a relay placed at a pathway for electrically connecting the cell to the external connection terminal, and it is preferable that at least one of the several connection terminals electrically connects the external connection terminal to the fuse or the relay. This makes it possible to place the fuse or the relay in the protection case, and thus makes it possible to prevent any damage to the fuse or the relay in case of solution leakage from the cell.

It is preferable in the battery according to the present invention that the housing has a sealed structure. This makes it possible to prevent water, etc. from entering the housing, enabling the battery to improve in safety. This also makes it possible to improve a lifetime characteristic of the battery.

In the following, one embodiment of the present invention will be described through the use of drawings. Note that compositions indicated in the drawings and described in the following descriptions are exemplifications and that the scope of the present invention is not to be considered limited to what is indicated in the drawings and described in the following descriptions.

Composition of Battery

FIG. 1 illustrates a diagrammatic perspective view of a battery in accordance with a first embodiment. FIG. 2 illustrates a diagrammatic cross-section view of the battery taken along the dashed line A-A of FIG. 1. FIG. 3 illustrates a diagrammatic perspective view of a protection case holding a battery management unit contained in the battery in accordance with the first embodiment; and FIGS. 4(*a*) and 4(*b*) respectively illustrate diagrammatic circuit diagrams of the battery in accordance with the first embodiment. FIGS. 5, 6 and 7 each illustrate a diagrammatic cross-section view of a battery in accordance with a second embodiment, a third embodiment, and a fourth embodiment. Note that a battery of the present embodiment includes the batteries of the first to fourth embodiments.

A battery 30 of the present embodiment is characterized by being provided with a cell 5, a battery management unit 3 for managing the cell 5, a protection case 2 holding the battery management unit 3, and a housing 1 containing the cell 5 and the protection case 2; and the battery is also characterized in that the protection case 2 inside is hermetically sealed.

In the following, the battery 30 of the present embodiment will be described.

1. Battery

The battery 30 of the present embodiment is used as, for example, a power source to automobiles, a power source to motorcycles, an electricity storage adapted for solar power, or a backup power source. The battery 30 can be provided so as to be chargeable and dischargeable.

2. Cell

The battery 30 is provided with the cell 5 housed in the housing 1. The cell 5 has a positive-electrode cell terminal and a negative-electrode cell terminal. (The positive-electrode cell terminal and the negative-electrode cell terminal will be referred to as cell terminals 17 in the present specification.) The cell 5 can be contained in a container 7 in such a way that the positive-electrode cell terminal and the negative-electrode cell terminal come to be situated on the upper side of the container.

The battery 30 may be provided with several cells 5 housed in the housing 1. These cells 5 may be connected in parallel or may be connected in series. As illustrated in the circuit diagrams of FIGS. 4(*a*) and 4(*b*), for example, the battery 30 of the first embodiment is provided with four cells 5*a* to 5*d*; and these cells 5 are connected in series. The cells 5 may be electrically connected by wiring, and the two cells 5 may be electrically connected by contacting the cell terminals 17 of the respective cells.

The cell 5 may be a sealed battery; and examples of the sealed battery include lithium-ion secondary batteries, nickel-hydrogen secondary batteries, and nickel-cadmium secondary batteries. The cell 5 may be a prismatic cell, a cylindrical cell, or a pouch cell. The cell 5 may have a structure where a positive electrode, a negative electrode, and an electrolytic solution are housed in a casing.

3. Housing

The battery 30 is provided with the housing 1 for housing the cell 5 and the protection case 2. The housing 1 can comprise the container 7 for containing the cell 5, and a lid 9. A part of a wiring board 8 may function as a part of the housing 1. In the battery 30 of the first embodiment as illustrated in FIGS. 1 and 2 and in the battery 30 of the second embodiment as illustrated in FIG. 5, the housing 1 is essentially constituted of the container 7, the lid 9, and a part of the wiring board 8; and in the battery 30 of the third embodiment as illustrated in FIG. 6 and in the battery 30 of the fourth embodiment as illustrated in FIG. 7, the housing 1 is essentially constituted of the container 7 and the lid 9. A base material of the container 7, of the lid 9, and of the wiring board 8 may be made from plastic.

The components of the housing 1 can be joined in such a way that the inside of the housing 1 becomes an enclosed space. For example, the components can be bound with an adhesive. This makes it possible to prevent water from entering (or infiltrating into) the housing 1, and makes it possible to improve safety and a lifetime characteristic of the battery 30.

4. Wiring Board

The battery 30 can be provided with the wiring board 8 having a wiring 15 that electrically connects the cell 5 to the battery management unit 3. The wiring board 8 can be situated between the cell 5 contained in the container land the lid 9. A part of the wiring board 8 may or may not function as a part of the housing 1. In the battery 30 of the first embodiment as illustrated in FIG. 1, a part of the wiring board 8 is configured to function as a part of the housing 1; and in the battery 30 of the fourth embodiment as illustrated in FIG. 7, the wiring board 8 is configured to be housed in the housing 1 and is not configured to function as a part of the housing 1. By making a part of the wiring board 8 be a part of the housing 1, it becomes possible for the wiring board 8 to have an external connection terminal 20.

As in the battery 30 illustrated in FIG. 6, the wiring 15 provided on the protection case 2 makes it possible to eliminate the wiring board 8. In a case where the cell 5 is connected to the battery management unit 3 through an electric wire such as a wire harness, the wiring board 8 may be eliminated.

The wiring board 8 can have a cell-side wiring terminal 18 coupled to the cell terminal 17 of the cell 5. The cell terminal 17 may be coupled to the cell-side wiring terminal 18 by ultrasonic welding, etc. or by a bolt and a nut. This allows the wiring 15 to connect to the cell terminal 17. The wiring board 8 may have a slit where the cell terminal 17 passes through. The cell-side wiring terminal 18 can be placed so as to be adjacent to the slit. The cell terminal 17 and the cell-side wiring terminal 18 can be coupled together on one side of the wiring board 8 opposite to the cell 5. This allows the cell terminal 17 of the cell 5 placed under the wiring board 8 to pass through the slit of the wiring board 8 and to be coupled to the cell-side wiring terminal 18, with the result that the cell 5 can be connected directly to the wiring board 8.

In a case where the container 7 contains several cells 5, the wiring board can be provided with several slits and cell-side wiring terminals 18 so that the cell terminal 17 of each cell 5 can be connected electrically to the wiring board 8.

The wiring board 8 can have a negative-electrode external connection terminal 20a and a positive-electrode external connection terminal 20b that are placed on portions where function as parts of the housing 1. (The negative-electrode external connection terminal 20a and the positive-electrode external connection terminal 20b will be referred to as the external connection terminals 20 in the present specification.) The external connection terminal 20 can be connected electrically to the cell-side wiring terminal 18 through the wiring 15. This makes it possible to charge or discharge the cell 5 through the external connection terminal 20. A part (or parts) of the wiring 15 between the external connection terminal 20 and the cell-side wiring terminal 18 may be embedded in the wiring board 8. This makes it possible to electrically connect the external connection terminal 20 to the cell-side wiring terminal 18 while retaining the inside of the housing 1 as the enclosed space.

In the battery 30, the wiring for electrically connecting the external connection terminal 20 to the cell-side wiring terminal 18 can have a fuse 22 or a relay 23. The fuse 22 or the relay 23 is configured to shut off the electric connection between the external connection terminal 20 and the cell-side wiring terminal 18 in response to a signal from the battery management unit 3. The fuse 22 or the relay 23 may be provided on the wiring board 8 or inside the protection case 2, or as a part of the battery management unit 3. The fuse 22 or the relay 23 can be placed, for example, as illustrated in the circuit diagrams of FIGS. 4(*a*) and 4(*b*) or the diagrammatic perspective view of FIG. 3.

The wiring board 8 can have several battery management unit-side wiring terminals. The battery management unit-side wiring terminals can be connected with connection terminals 6 provided on the protection case 2. This makes it possible to electrically connect the cell 5 to the battery management unit 3.

The wiring board can have several cell-side wiring terminals 18 and several battery management unit-side wiring terminals so that the battery management unit 3 can manage an electric voltage of each cell 5. The cell-side wiring terminals 18 and the battery management unit-side wiring terminals can be provided in such a way as to form an electric circuit, for example, as in the circuit diagrams illustrated in FIGS. 4(*a*) and 4(*b*).

5. Battery Management Unit

The battery management unit 3 is to manage the cell 5. The battery management unit 3 is an electronic circuit board on which, for example, electronic components are mounted. The battery management unit 3 may be a part of the electronic circuit board. The battery management unit 3 may comprise several electronic circuit boards. The battery management unit 3 is held in the protection case 2. The battery management unit 3 can be connected electrically to the cell 5, the fuse 22, the relay 23, or the external connection terminal 20. This enables the battery management unit 3 to manage the cell. The battery management unit 3 can have the fuse 22 or the relay 23 as a part of the electronic circuit board held in the protection case 2. As illustrated in the circuit diagrams of FIGS. 4(*a*) and 4(*b*), for example, the battery management unit 3 can be connected electrically to the cells 5 and others.

The battery management unit 3 can be provided in such a way as to measure an electric voltage of each cell 5. The battery management unit 3 can be provided in such a way as to detect an overcharge on the basis of measurement results of the electric voltage of the cell 5. The battery management unit 3 is configured to output a signal to shut off the connection between the cell 5 and the external connection terminal 20 with use of the fuse 22 or the relay 23 once the battery management unit detects an overcharge of at least one cell 5. This makes it possible to forcibly interrupt an electric current when the at least one cell 5 is overcharged, enabling the battery 30 to improve in safety.

The battery management unit 3 may be provided in such a way as to detect the overcharge of the cell 5, to measure a temperature inside the housing 1, and/or to detect an overcurrent. The battery management unit 3 can be provided in such a way as to keep balance of electric voltages of the several cells 5 contained in the container 7. This makes it possible to reduce damage to the cells 5 that could be caused by unbalance of the electric voltages of the several cells 5, enabling the battery 30 to improve in lifetime characteristic. The battery management unit 3 can have balancers that respectively correspond to the cells 5.

6. Protection Case

The protection case 2 is to hold the battery management unit 3, is housed in the housing 1, and is hermetically sealed so as to have an enclosed space therein. This enables the housing 1 to have separate spaces: a space for the cells 5 and a space for the battery management unit 3. This configuration can prevent the electrolytic solution from entering (or infiltrating into) the protection case 2 that holds the battery management unit 3 therein in case the solution leaks out of any of the cells 5, preventing any damage to the battery management unit 3. This makes it possible to improve the safety of the battery 30. The protection case 2 is made of, for example, plastic.

The enclosed space where the battery management unit 3 is situated may be formed with the protection case 2 and a sealing material 12, as in the battery 30 illustrated in FIG. 2 in accordance with the first embodiment; or may be formed with the protection case 2, the sealing material 12, and the lid 9, as in the battery 30 illustrated in FIG. 5 in accordance with the second embodiment; or may be formed with the protection case 2 and the lid 9; or may be formed with the protection case 2 only. The sealing material 12 may be, for example, a rubber sheet. The sealing material 12 may be provided in such a way as to cover an opening of the protection case 2, as in the battery 30 illustrated in FIG. 2 in accordance with the first embodiment; or may be provided between a side wall of the protection case 2 and the lid 9, as in the battery 30 illustrated in FIG. 5 in accordance with the second embodiment. The sealing material 12 may be tightly held between the protection case 2 and the lid 9. This enables the sealing material 12 to closely contact to the protection case 2 and to the lid 9, with the result that the inside of the protection case 2 becomes the enclosed space. Or, the protection case 2 may be allowed to adhere to the lid 9, for example, with use of an adhesive so that the inside of the protection case 2 becomes the enclosed space. Or, the protection case 2 may be covered with a plastic sheet in an adhesive fashion or in a welding fashion, forming the enclosed space; or a sealing material may be interposed between the plastic sheet and the lid 9.

The protection case 2 can be provided with several connection terminals 6 that lead from the inside of the protection case 2 to the outside. At least one of the connection terminals 6 is connected electrically to the battery management unit 3. A part (or parts) of a wiring between the connection terminals 6 and the battery management unit 3 may be embedded in the protection case 2. This makes it possible to electrically connect the connection terminals 6 to the battery management unit 3 while retaining the inside of the protection case 2 as the enclosed space. At least one of the connection terminals 6 can be connected electrically to the cell 5. At least one of the connection terminals 6 can be connected electrically to the external connection terminal 20. This allows the battery management unit 3 to be connected electrically to wirings between the cells 5 and to wirings between the cells 5 and the external connection terminals 20, enabling the battery management unit 3 to manage the electric voltage of each cell 5. In a case where the fuse 22 or the relay 23 is provided as a part of the battery management unit 3 or in a case where the fuse 22 or the relay 23 is placed inside the protection case 2, the fuse 22 or the relay 23 can be connected electrically to the external connection terminal 20 through the connection terminal 6. For example, as illustrated in FIG. 3, the protection case 2 has six connection terminals 6 indicated by 6a to 6f. The connection terminals 6 can be configured to form the circuit, for example, as illustrated in the circuit diagrams of FIGS. 4(a) and 4(b). The connection terminals 6 can be respectively coupled to the battery management unit-side wiring terminals provided to the wiring board 8. The connection terminals can be connected to terminals through an electric wire such as a wire harness. This makes it possible to electrically connect the battery management unit 3 to the cells 5 through the wiring 15.

REFERENCE SIGNS LIST

1 Housing
2 Protection case
3 Battery management unit
5, 5a, 5b, 5c, 5d Cell
6, 6a, 6b, 6c, 6d, 6e, 6f Connection terminal
7 Container
8 Wiring board
9 Lid
12 Sealing material
15 Wiring
17 Cell terminal
18 Cell-side wiring terminal
20, 20a, 20b External connection terminal
22 Fuse
23 Relay
30 Battery

The invention claimed is:

1. A battery comprising a cell, a battery management unit for managing the cell, a protection case holding the battery management unit, a housing containing the cell and the protection case, an external connection terminal connected electrically to the cell, and a fuse or a relay, and a wiring board having a wiring that electrically connects the cell to the battery management unit, wherein the protection case inside is hermetically sealed,
the protection case is provided with lead connection terminals that lead from the inside of the protection case to the outside,
at least one of the lead connection terminals electrically connects the battery management unit to the cell,
the fuse or the relay is placed at a pathway for electrically connecting the cell to the external connection terminal,
the battery management unit is configured to output a signal to shut off the electric connection between the cell and the external connection terminal with use of the fuse or the relay once the battery management unit detects an overcharge of the cell,
the housing comprises a lid and a container for containing the cell,
the wiring board is situated between the cell contained in the container and the lid, and
the protection case is situated between the wiring board and the lid.

2. A battery comprising a cell, a battery management unit for managing the cell, a protection case holding the battery management unit, a housing containing the cell and the protection case, an external connection terminal connected electrically to the cell, and a wiring board having a wiring that electrically connects the cell to the battery management unit, wherein
- the protection case inside is hermetically sealed,
- the protection case is provided with lead connection terminals that lead from the inside of the protection case to the outside,
- at least one of the lead connection terminals electrically connects the battery management unit to the cell,
- the battery management unit has a fuse or a relay placed at a pathway for electrically connecting the cell to the external connection terminal,
- at least one of the lead connection terminals electrically connects the external connection terminal to the fuse or the relay,
- the housing comprises a lid and a container for containing the cell,
- the wiring board is situated between the cell contained in the container and the lid, and
- the protection case is situated between the wiring board and the lid.

3. The battery according to claim 1, wherein a part of the wiring board is a part of the housing.

4. The battery according to claim 1, wherein
- the wiring board is provided with a cell-side wiring terminal and a slit that penetrates the wiring board,
- the cell is provided with a cell terminal,
- the cell terminal passes through the slit and is coupled to the cell-side wiring terminal.

5. The battery according to claim 1, further comprising a sealing material provided between the protection case and the lid, wherein the protection case is hermetically sealed with the sealing material.

6. The battery according to claim 1, wherein
- the housing houses cells including the cell, and
- the cells are connected in series or in parallel.

7. The battery according to claim 6, wherein the battery management unit is configured to measure an electric voltage of each cell.

8. The battery according to claim 7, wherein the housing has a sealed structure.

9. The battery according to claim 2, wherein a part of the wiring board is a part of the housing.

10. The battery according to claim 2, wherein
- the wiring board is provided with a cell-side wiring terminal and a slit that penetrates the wiring board,
- the cell is provided with a cell terminal,
- the cell terminal passes through the slit and is coupled to the cell-side wiring terminal.

11. The battery according to claim 3, wherein
- the wiring board is provided with a cell-side wiring terminal and a slit that penetrates the wiring board,
- the cell is provided with a cell terminal,
- the cell terminal passes through the slit and is coupled to the cell-side wiring terminal.

12. The battery according to claim 9, wherein
- the wiring board is provided with a cell-side wiring terminal and a slit that penetrates the wiring board,
- the cell is provided with a cell terminal,
- the cell terminal passes through the slit and is coupled to the cell-side wiring terminal.

13. The battery according to claim 2, further comprising a sealing material provided between the protection case and the lid, wherein the protection case is hermetically sealed with the sealing material.

14. The battery according to claim 3, further comprising a sealing material provided between the protection case and the lid, wherein the protection case is hermetically sealed with the sealing material.

15. The battery according to claim 9, further comprising a sealing material provided between the protection case and the lid, wherein the protection case is hermetically sealed with the sealing material.

16. The battery according to claim 4, further comprising a sealing material provided between the protection case and the lid, wherein the protection case is hermetically sealed with the sealing material.

17. The battery according to claim 10, further comprising a sealing material provided between the protection case and the lid, wherein the protection case is hermetically sealed with the sealing material.

18. The battery according to claim 11, further comprising a sealing material provided between the protection case and the lid, wherein the protection case is hermetically sealed with the sealing material.

19. The battery according to claim 12, further comprising a sealing material provided between the protection case and the lid, wherein the protection case is hermetically sealed with the sealing material.

20. The battery according to claim 2, wherein
- the housing houses cells including the cell, and
- the cells are connected in series or in parallel.

21. The battery according to claim 20, wherein the battery management unit is configured to measure an electric voltage of each cell.

22. The battery according to claim 21, wherein the housing has a sealed structure.

* * * * *

UNITED STATES PATENT AND TRADEMARK OFFICE
CERTIFICATE OF CORRECTION

Page 1 of 1

PATENT NO. : 10,873,063 B2
APPLICATION NO. : 16/061983
DATED : December 22, 2020
INVENTOR(S) : Hideyuki Sugiyama et al.

It is certified that error appears in the above-identified patent and that said Letters Patent is hereby corrected as shown below:

In the Claims

Claim 1, Column 8, Line 46, replace "cell, and a fuse or a relay," with "cell, a fuse or a relay,"

Signed and Sealed this
First Day of June, 2021

Drew Hirshfeld
*Performing the Functions and Duties of the*
*Under Secretary of Commerce for Intellectual Property and*
*Director of the United States Patent and Trademark Office*